United States Patent Office 2,876,253
Patented Mar. 3, 1959

2,876,253

PROCESS OF ESTERIFICATION IN THE PRESENCE OF HYDROXYLAMINE TO INHIBIT DISCOLORATION

Vincent L. Hughes, Clark Township, Union County, Isidor Kirshenbaum, Westfield, and Alan A. Schetelich, Cranford, N. J., assignors to Esso Research and Engineering Company, a corporation of Delaware No Drawing. Application March 11, 1957
Serial No. 644,995

7 Claims. (Cl. 260—475)

This invention relates to a process of preparing plasticizers having improved color properties by the reaction of an acidic component and alcohol in the presence of certain hydroxylamines. Still more specifically this invention relates to the esterification of an acidic component with a carbonyl contaminated alcohol in the presence of sulfuric acid catalyst and in the presence of hydroxylamine, including the mineral acid salts thereof.

The ever expanding use of plastic materials such as vinyl chloride polymers or copolymers, polyvinyl acetate, cellulose esters, acrylate and methacrylate resins, rubbers such as the emulsion copolymers of butadiene and styrene or acrylonitrile, or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalate, as well as the esters of maleic acid, adipic acid, azelaic acid, sebacic acid or their anhydrides, have been known to be extremely satisfactory plasticizers for the aforementioned high molecular weight materials. For the esterification, acid reacting compounds having two acid radicals such as dicarboxylic acids and/or their anhydrides are suitable for reaction with the desired alcohol.

These plasticizer esters are generally prepared by the esterification of an alcohol, e. g. $C_6$–$C_{14}$ alcohol, with an acidic reactant such as phthalic acid, the anhydride thereof or any of the acidic reactants noted above. In general, the alcohol is employed in amounts from stoichiometric to substantial excesses and heated, preferably in the presence of an acid catalyst such as benzene sulfonic acid, toluene sulfonic acid, naphthalene sulfonic acid or the like. Entrainers or azeotrope formers may be employed during the reaction to effect the removal of water at lower temperatures since it is known that severe operating conditions, including high temperatures and strongly acidic catalysts, tend to magnify any discoloration which may result from contaminants in the alcohol reactant. Entrainers usually employed are the low boiling aromatics such as benzene, toluene, xylene and the like, paraffinic hydrocarbons of suitable boiling points, e. g. heptane and octane or olefinic materials such as diisobutylene, etc. Various processes applicable to the manufacture of these plasticizer esters are known and this invention does not depend on any specific one. Also numerous acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds and carbonyl-forming compounds such as acetals affect to a marked degree the color of the final ester product. To counteract the discoloring effect, especially of carbonyls, on the ester most commercial esterification processes employ mild conditions and carefully control the reaction medium. Thus mild p-toluene sulfonic acid is employed in lieu of sulfuric acid and the reaction mixture is kept free of oxygen usually by blanketing the system with $CO_2$ or other inert gases. Para-toluene sulfonic acid is considerably more expensive than sulfuric acid and more sulfonic acid is necessary to catalyze the reaction due to its lower order of activity. Therefore it would be a considerable advance in the art and a substantial savings in manufacturing cost if sulfuric acid could be employed with carbonyl contaminated alcohols and if the reaction could be run open to the atmosphere.

At present a principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be cleaned up effectively by caustic washing, extensive distillation and similar treatments, the final alcohol product obtained in general will contain sufficient amounts of aldehyde and/or carbonyl-forming compounds such as acetals to seriously affect the ultimate color qualities of any ester prepared therefrom. Oxo alcohols will contain generally from 0.01 to 0.2 wt. percent or higher carbonyl or carbonyl-forming compounds. Dimer alcohols prepared by a modified oxo route are also valuable as intermediates in the preparation of esters and are subject to the same contamination problems as the ordinary oxo alcohols.

One potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separatable from the alcohol or separatable only with extensive costly treatment. Alternatively the alkyl metal may be made directly by reaction of olefin with metal and $H_2$. An alkyl metal of this type is easily converted to alcohols in the manner described above. In accordance with this invention alcohols from any source which will result, when esterified in the presence of sulfuric acid, in a discolored ester, may be employed.

It is therefore a primary object of this invention to prepare plasticizers which are colorless or near colorless by the esterification process employing sulfuric acid as the catalyst. If desired this reaction may be run open to the atmosphere. The above objects are accomplished by carrying out this sulfuric acid catalyzed reaction in the presence of a hydroxylamine, such as hydroxylamine, hydroxylamine hydrochloride, hydroxylamine hydrosulfate or other mineral acid salts of hydroxylamine. The particular source of the alcohol reactant is of no great significance insofar as this invention is concerned if the alcohol contains as contaminant a carbonyl or carbonyl-forming compound which would include acetals. However for the purpose of defining with more particularity some of the alcohol sources which may be used in this reaction, reference may be had to U. S. Patent No. 2,637,746 to Parker, which describes in detail the oxo process and to a copending commonly assigned application, Serial No. 578,902, filed April 18, 1956, which describes one process for the preparation of alcohols via the so-called alkyl metal route.

The hydroxylamine additives of this invention are preferably employed in small quantities in the range of 0.01 to 1.5 wt. percent, preferably 0.1 to 0.6 wt. percent, based on alcohol. The amount will depend to a degree on the sulfuric acid concentration. High acid concentrations require larger amounts of hydroxylamine additive. Also the hydroxylamine may be added to the alcohol and/or acidic component prior to the esterification or if desired during the reaction.

To demonstrate the effectiveness of the present additives with regard to the color of plasticizer esters, carbonyl contaminated alcohols were employed in a severe esterification process designed to magnify any tendency toward discoloration due to contaminants which may be present in the alcohol. In the following table phthalic anhydride was reacted with the alcohol specified in a mole ratio of 1:2 at 130° C. and in the presence of 1 wt. percent $H_2SO_4$ based on alcohol for 90 minutes. Since the discoloration of the ester was substantial as a result of the severe conditions, the Gardner color scale was employed. In the Gardner color scale each unit is comparable to approximately 160 on the Hazen scale. The discoloration was due principally to the carbonyl contaminants in the alcohol reactant and magnified by the conditions employed:

TABLE.—ESTER QUALITY IMPROVED BY PRESENCE OF HYDROXYLAMINE ADDITIVE DURING REACTION

Phthalate ester preparation employing phthalic anhydride, $C_{10}$ oxo alcohol with $H_2SO_4$ catalyst

| Additive Compound | Moles/100 Gms. Alcohol | Wt. Percent Alcohol | Gardner (Ester) Color |
|---|---|---|---|
| Control | 0 | 0 | 3.75 |
| Hydroxylamine Hydrochloride | 0.0023 | [1] <0.16 | 1.5 |
| Urea | 0.0023 | [1] <0.07 | 3.5 |
| Ethylamine | 0.0023 | 0.1 | 2.5 |
| Triethylamine | 0.0023 | 0.22 | 3.5 |

[1] These compounds were not entirely soluble in the reaction mixture. Exact concentration not determined.

When employing $C_{10}$ oxo alcohol without hydroxylamine hydrochloride an extremely high ester color was noted. Less than 0.16 wt. percent of hydroxylamine hydrochloride on alcohol reduced the color from 3.75 to 1.5 on the Gardner scale. The $C_{10}$ alcohol contained .06% carbonyl as determined by carbonyl number.

The above table clearly shows that esters having a reduced color rating may be prepared even when employing alcohol reactants containing carbonyl contaminants under severe conditions including the use of concentrated sulfuric acid catalyst and allowing the reaction medium to be exposed to atmospheric conditions. This invention therefore permits the use of inexpensive processes not requiring special apparatus and as a major factor the employment of relatively inexpensive sulfuric acid in lieu of toluene or other sulfonic acids.

The esterification process to which this invention relates comprises the reaction of 2 to 2.5 moles of alcohol per mole of the desired dicarboxylic acid or anhydride in the presence of $H_2SO_4$ catalyst at a temperature of about 100° to 200° C. for a period of 30 to 180 minutes. The reaction mixture may be blanketed under slight pressure by $CO_2$, $N_2$ or other inert gases to exclude oxygen although this is not necessary. 100% sulfuric acid catalyst may be employed in an amount between 0.1 to 1.5 wt. percent on alcohol. Equivalent amounts of less concentrated acid may be employed in lieu of the concentrated acid. The reaction product is then preferably washed with aqueous caustic, e. g. 2 to 20%, to remove excess acidity resulting from the catalyst employed and any unconverted acid reactant. Subsequent to the caustic wash the product is then water washed to remove water soluble impurities such as the sodium sulfate or other inorganic salt formed during the reaction in the presence of the hydroxylamine. Both of these washing steps may be carried out at ambient or slightly elevated temperatures if desired. Normally a water entrainer such as benzene, toluene, xylene, etc., is employed to permit rapid removal of water. About 2 to 30 wt. percent on total reactants is preferred.

Subsequent to the caustic and water washing procedure the product is then topped or distilled to remove slight amounts of water and unreacted alcohol and the plasticizer ester is recovered in a relatively pure state. A typical phthalate ester of $C_{10}$ alcohol boils at about 420° C.

Plasticizers were prepared in accordance with the following examples:

EXAMPLE 1

148 grams of phthalic anhydride, 335 grams of oxo decyl alcohol, 75 cc. of toluene entrainer and 1 wt. percent of concentrated sulfuric acid on alcohol were heated to about 120° C. whereupon the reaction started and heating was continued until a final temperature of 160° C. was reached. The total reaction time was about 55 minutes. The reaction mixture was then washed with 5 wt. percent aqueous sodium hydroxide in an amount of one-third the volume of product and then washed with water at ambient temperatures. The resulting ester had a color rating of 60 on the Hazen scale.

EXAMPLE 2

The reaction of Example 1 was repeated identically with exception that 0.5 gram of hydroxylamine hydrochloride was added to the reaction mixture. In this experiment the ester had a color rating of 30 on the Hazen scale.

EXAMPLE 3

The experiment of Example 1 was repeated identically with exception that 0.2 gram of hydroxylamine hydrochloride was included in the reaction mixture. In this experiment the ester had a color rating of 15 on the Hazen scale.

It will be noted that the use of 0.2 gram hydroxylamine hydrochloride effected a better ester color than the use of 0.5 gram under these conditions, indicating that caution should be exercised regarding the use of more additive than necessary.

What is claimed is:

1. In a process of preparing esters wherein an acidic compound is reacted with an alcohol contaminated with a compound selected from a group consisting of carbonyl, carbonyl-forming compounds and mixtures thereof, said alcohol having from 6 to 14 carbon atoms per molecule in the presence of a sulfuric acid catalyst, the improvement which comprises carrying out the reaction in the presence of a hydroxylamine in an amount sufficient to inhibit discoloration.

2. A process according to claim 1 wherein said hydroxylamine is hydroxylamine hydrochloride.

3. A process according to claim 1 wherein said hydroxylamine is hydroxylamine hydrosulfate.

4. In a process of preparing esters suitable for use as plasticizers wherein one mole of an acidic compound selected from the group consisting of dicarboxylic acids and their anhydrides is reacted with at least two moles of an alcohol contaminated with a compound selected from the group consisting of carbonyl, carbonyl-forming compounds and mixtures thereof said alcohol having from 6 to 14 carbon atoms per molecule, at elevated temperatures and in the presence of a sulfuric acid catalyst, the improvement which comprises carrying out the reaction in the presence of a hydroxylamine in an amount sufficient to inhibit discoloration.

5. A process according to claim 4 wherein said hydroxylamine is hydroxylamine hydrochloride.

6. A process according to claim 4 wherein said hydroxylamine is hydroxylamine hydrosulfate.

7. A process of preparing esters suitable for use as plasticizers wherein phthalic anhydride is reacted with at least two moles of decyl alcohol containing a contaminant selected from the group consisting of carbonyl, carbonyl-forming compounds and mixtures thereof at temperatures between 100° to 200° C. in the presence of from 0.1 to 1.5 wt. percent sulfuric acid and in the presence of from 0.01 to 1.5 wt. percent of a hydroxylamine.

References Cited in the file of this patent
UNITED STATES PATENTS

| | | |
|---|---|---|
| 2,593,428 | Fischer et al. | Apr. 22, 1952 |
| 2,631,970 | Barnes | Mar. 17, 1953 |
| 2,713,075 | Doeringer et al. | July 12, 1955 |